United States Patent

Onda

[11] Patent Number: 6,046,864
[45] Date of Patent: Apr. 4, 2000

[54] ZOOM LENS BARREL ASSEMBLY FOR A CAMERA

[75] Inventor: Kazuhiko Onda, Saitama, Japan

[73] Assignee: Fuji Photo Optical Co., Ltd., Saitama, Japan

[21] Appl. No.: 09/162,759

[22] Filed: Sep. 30, 1998

[30] Foreign Application Priority Data

Sep. 30, 1997 [JP] Japan .................................. 9-266477

[51] Int. Cl.[7] .................................................. G02B 7/02
[52] U.S. Cl. ........................ 359/819; 359/822; 359/830
[58] Field of Search ........................... 359/819, 822–826, 359/830

[56] References Cited

U.S. PATENT DOCUMENTS

| | | | |
|---|---|---|---|
| 5,592,250 | 1/1997 | Shimizu | 396/79 |
| 5,699,199 | 12/1997 | Cho et al. | 359/698 |
| 5,732,290 | 3/1998 | Shimose et al. | 396/83 |

FOREIGN PATENT DOCUMENTS

| | | |
|---|---|---|
| 6-100707 | 12/1994 | Japan . |
| 9-43487 | 2/1997 | Japan . |

*Primary Examiner*—Georgia Epps
*Assistant Examiner*—Suzanne Letendre
*Attorney, Agent, or Firm*—Young & Thompson

[57] ABSTRACT

A zoom lens assembly for a zoom lens having at least two lens groups comprises at least one rotatable lens barrel equipped with a first guide cam for shifting one of the two lens group relative to the lens barrel along the optical axis, a rotatable ring member equipped with a second guide cam for shifting the lens barrel along the optical axis and an electromagnetically operated clutch mechanism for locking the rotatable ring member to permit relative rotation of the lens barrel to the ring member so as to shift the lens group according to the first and second guide cams for focusing the zoom lens and unlocking the rotatable ring member from the lens barrel to cause integral rotation of the rotatable ring member and the lens barrel so as to shift the lens group according to the first guide cam only for adjusting a zoom ratio of the zoom lens.

7 Claims, 10 Drawing Sheets

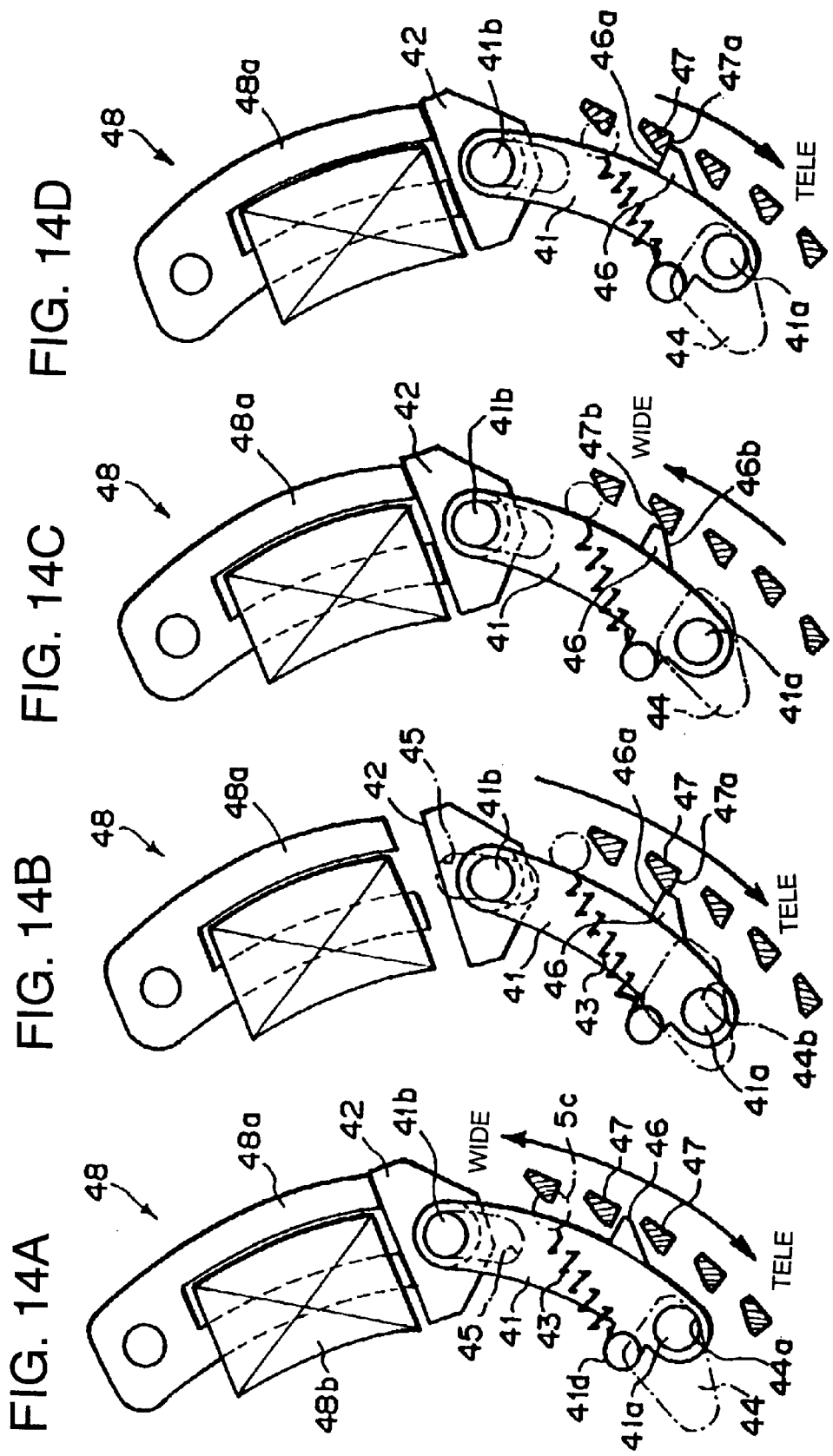

ZOOM LENS BARREL ASSEMBLY FOR A CAMERA

BACKGROUND OF THE INVENTION

1. Field of the Invention

This invention relates to a zoom lens barrel assembly for a camera, and, more particularly, to a power driven zoom lens barrel assembly for a camera which is operated by a single power drive element to achieve both adjusting a zoom ratio of the zoom lens and focusing the zoom lens.

2. Description of Related Art

In most zoom lenses, lens groups of the zoom lens are moved along optical axis by means of a cam mechanism differently between focusing the zoom lens on a subject and adjusting a zoom ratio of the zoom lens. To enable the zoom lens to achieve focusing and zooming by means of a power drive mechanism, there have been proposed several techniques. Specifically, one of the techniques employs separate power drive elements such as electric motors for focusing and zoom ratio adjusting, respectively. Another technique employs a single power drive element. In the case where a single power drive element is used for both focusing and zoom ratio adjusting, there have been known three ways. One of them is to divide driving power of the single power drive element into two power transmission paths for a focusing mechanism and a zoom ratio adjusting mechanism. The second is, as known from Japanese Patent Publication No. 6-100707, to incorporate a mechanism common to focusing and zoom ratio adjusting and achieve focusing and zoom ratio adjusting alternately. The last one, as known from Japanese Unexamined Patent Publication No. 9-43487, incorporates a restraint mechanism which causes relative axial movement along the optical axis between two lens groups of the zoom lens to achieve zoom ratio adjusting and locking axial movement of one of the two lens groups relative to the other during focusing.

The utilization of two power drive elements always yields an increase in camera price. The single power drive element cooperating with separate drive mechanisms for focusing and zoom ratio adjusting always needs an increased number of parts with an adverse effects of not only increasing costs but also increasing an overall size of the camera. The combination of a single power drive element and a common drive mechanism has a necessity for providing alternate lens guide cam slots for focusing and zoom ratio adjusting which makes a lens drive mechanism quite complex. While the last zoom lens drive system can remove the above drawbacks, however, the locking mechanism incorporates an electromagnetic solenoid to disconnect cooperation of one of the two lens groups with its associated cam to lock the axial movement of the lens group and holds the lens group with friction only so as to remain immovable which possibly leads to unstable focusing operation.

SUMMARY OF THE INVENTION

It is accordingly an object of the invention to provide a zoom lens barrel assembly which eliminates almost all drawbacks of the prior art zoom lens barrel assemblies.

It is another object of the invention to provide a zoom lens barrel assembly which is compact in overall size and provided at low costs.

These objects of the invention is accomplished by providing a zoom lens barrel assembly for a zoom lens of the type in which only one of a plurality of lens barrels is driven to achieve both focusing and zoom ratio adjustment of the zoom lens. The zoom lens barrel assembly comprises first and second lens guide mechanisms selectively actuated by an electrically operated clutch mechanism. Specifically, a first lens guide mechanism is actuated to shift at least one lens group of the zoom lens to achieve focusing of the zoom lens, and a second lens guide mechanism is actuated to shift the lens group differently from the first lens guide mechanism to adjust a zoom ratio of the zoom lens.

According to a preferred embodiment of the invention, the zoom lens barrel assembly for a zoom lens comprising at least first and second lens groups includes a first barrel rotatable about the optical axis to shift the first lens group along the optical axis to focus and adjust a zoom ratio of the zoom lens, a second barrel arranged coaxially with the first barrel and rotatable about the optical axis following rotation of the first barrel which is provided with first guide means for shifting the second lens group back and forth relatively to the second barrel along the optical axis according to rotation of the second barrel, a ring member arranged coaxially with the first and second barrels and rotatable relatively to the second barrel about the optical axis which is provided with second guide means for shifting the second barrel back and forth relatively to the rotatable ring member when the rotatable ring member and the rotatable second barrel rotate relatively to each other. A clutch mechanism locks the ring member to permit relative rotation between the ring member and the second barrel to shift the second lens group according to the first and second guide means for focusing while the first barrel is rotated and unlocks the ring member to couple these ring member and second barrel so that the ring member rotates following rotation of the second barrel to shift the second lens group according to the first guide means for zoom ratio adjusting while the first barrel is rotated.

The clutch mechanism which may include an encoder for detecting rotational angular positions of the second barrel is preferably disposed around the first lens group.

The clutch mechanism may comprise an electromagnetic solenoid which is energized during focusing and deenergized during zoom ratio adjusting, positioning means for positioning the ring member in a desired one of a plurality of predetermined zoom positions relative to the second barrel when the electromagnetic solenoid is energized.

Specifically, the positioning means comprises latch teeth arranged at regular angular intervals on the ring member to define the predetermined zoom positions, a latch lever engageable with the latch teeth, and a tension member for imparting tension on the latch lever toward said latch teeth. The electromagnetic solenoid attracts the latch lever to bring the latch lever into engagement with any one of the latch teeth when energized so as thereby to position the ring member in one of the predetermined zoom positions and releases the latch lever to permit the ring member to rotate against the tension member. The latch teeth on the ring member are preferably arranged on a circular-arcuate line segment round a center on the optical axis, and the latch lever is pivotally mounted on the ring member so as to swing along a circular-arcuate line segment passing the optical axis when attracted by the electromagnetic solenoid.

According to the zoom lens barrel assembly of the invention, focusing and zoom ratio adjusting are selectively effected by operating the clutch mechanism, which makes it easy to achieve focusing and zoom ratio adjusting by means of a single power drive device such as an electric motor. The ring member equipped with the second guide means for focusing is mechanically coupled to the second barrel equipped with the first guide means to shift the second lens group according to the first guide means for adjusting a zoom ratio, and is permitted to rotate relatively to the second barrel to shift the second lens group according to the first and second guide means for focusing. The clutch mechanism makes the zoom lens barrel simple in structure and stable in operation for selectively achieving focusing and zoom ratio adjusting. Furthermore, the clutch mechanism incorporating en electromagnetic solenoid as an actuator of thereof ensures reliable positioning of the zoom lens in any predetermined zoom position and accurate focusing in any zoom position.

BRIEF DESCRIPTION OF THE DRAWINGS

The above and other objects and features of the present invention will be understood from the following description of a specific embodiment thereof when considering in conjunction with the accompanying drawings wherein like numbers have been employed in the different figures to denote the structurally and operationally same parts and mechanisms, and in which:

FIGS. 14A–14D are explanatory illustrations of actions of a clutch mechanism.

DETAILED DESCRIPTION OF THE SPECIFIC EMBODIMENT

Because zoom lens barrel assemblies are well known, the present description will be directed in particular to elements and mechanisms forming part of, or cooperating directly with, assembly in accordance with the present invention. It is to be understood that elements not specifically shown or described can take various forms well known to those skilled in the art.

Figure 1:
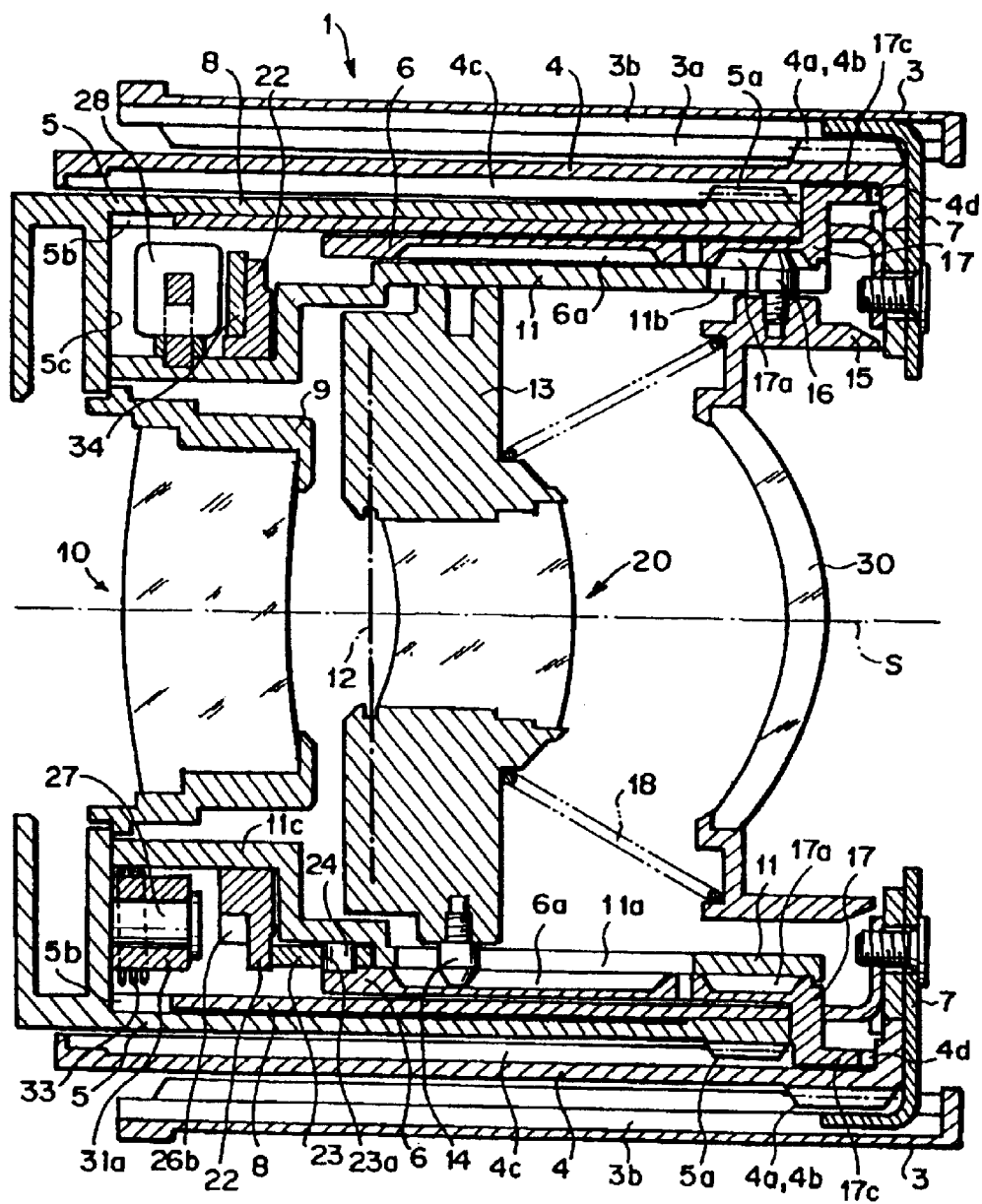
FIG. 1 is a cross-sectional view of a zoom lens barrel assembly in accordance with an embodiment of the invention which is placed in a wide-angle position.
Figure 2:
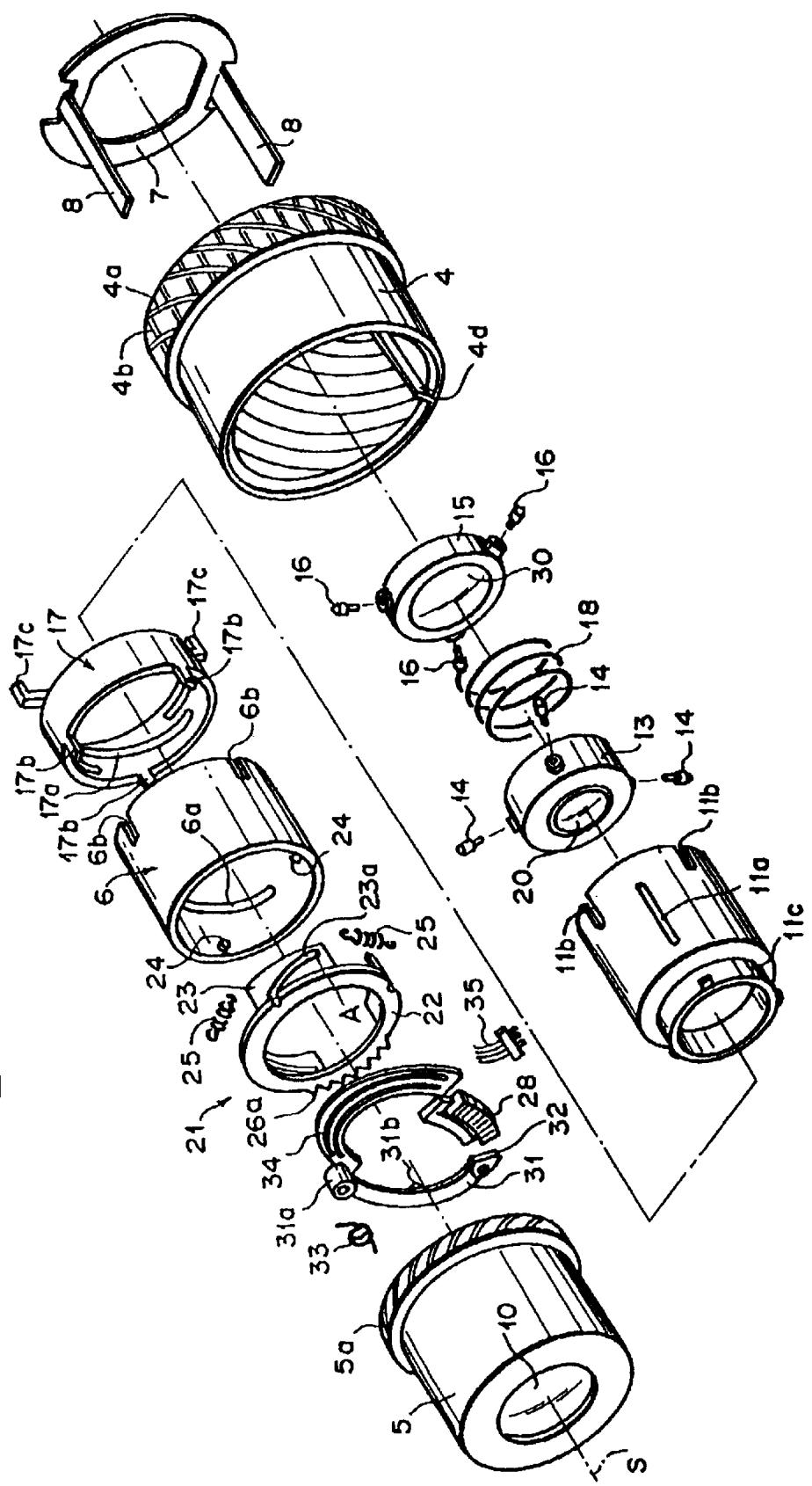
FIG. 2 is an exploded perspective view of the zoom lens barrel assembly shown in FIG. 1.

Referring to the drawings in detail, in particular, to FIGS. 1 and 2 schematically showing a zoom lens barrel assembly 1 in accordance with an embodiment of the invention, the zoom lens barrel assembly 1, which holds a zoom lens consisting of, for example in this example, first to third lens groups 10, 20 and 30, comprises cylindrical lens barrels coaxially arranged along an optical axis S of a zoom lens, namely an outer lens barrel 3 fixedly mounted to a camera body (not shown), a first intermediate lens barrel or first rotatable lens barrel 4 disposed to rotate in the outer lens barrel 3, a second intermediate lens barrel 5 disposed in the first intermediate lens barrel 4 to move back and force along the optical axis S following rotation of the first intermediate lens barrel 4 in opposite direction, and an inner lens barrel or second rotatable lens barrel 6 disposed to rotate in the second intermediate lens barrel 5.

The outer lens barrel 3 is formed with internal helical threads 3a and axially extending internal guide grooves 3b arranged diametrically opposite to each other on the inside wall thereof. The first intermediate lens barrel 4 is formed with external helical threads 4a on the outside wall thereof which are engaged by the internal helical threads 3a of the outer lens barrel 3, internal helical threads 4c on the outside wall thereof and internal axial guide grooves 4d arranged diametrically opposite to each other on the inside wall thereof. It is partly formed with external axial threads 4b on the outside wall thereof which are engaged by axial threads of a gear rod (not shown) linked to an electric motor (not shown). When the electric motor is driven in one direction, the first intermediate lens barrel 4 is rotated through the gear rod and moved back or force along the optical axis S relative to the outer lens barrel 3 through engagement of helical threads 3a and 4a. Further, the first intermediate lens barrel 4 at its rear end (which is referred to the side adjacent to the camera body) is provided with a support ring 7 by which it is supported for rotation. The support ring 7 has integrally formed straight guide rails 8 extending forward at a right angle from the support ring 7 and arranged diametrically opposite to each other which are received in the axial guide grooves 3b of the outer lens barrel 3 to slide back and forth along the optical axis S.

The second intermediate lens barrel 5 is formed with external helical threads 5a on the outside wall thereof which are engaged by the internal helical threads 4c of the first intermediate lens barrel 4 and axially extending internal guide grooves 5b arranged diametrically opposite to each other on the inside wall thereof which receive the guide rails 8 to guide back and forth axial movement of the second intermediate lens barrel 5. The second intermediate lens barrel 5 at its front end holds a first annular lens holder ring 9 by which the first lens group 10 is held. As will be described later, the second intermediate lend barrel 5 is integrally formed with an annular partition wall 5c. The inner lens barrel 6 receives and supports the first intermediate lens barrel 4 for rotation and a shift barrel 11 attached to the front end of the second intermediate lens barrel 5 for back and forth axial movement and further holds a second annular lens holder ring 13 by which the second lens group 20 is held and in which a shutter unit (not shown) including a shutter blade 12 is incorporated. The second lens holder ring 13 is provided with three radial cam follower pins 14 arranged at regular angular intervals on the outside wall thereof. Further, the inner lens barrel 6 is formed with three first or zooming internal cam grooves 6a (only one of which is shown in FIG. 2), which are spatially spiral with respect to the optical axis S, on the inside wall thereof, three axial end slots 6b arranged at regular angular intervals and three cam follower pins 24 radially extending from and arranged at regular angular intervals on the inside wall thereof. These zooming cam grooves 6a receive the cam follower pins 14 passing through axial guide slots 11a formed in the shift barrel 11, respectively. Through engagement between the zooming cam grooves 6a and the cam follower pins 14, the second lens holder ring 13 shifts back and forth along the optical axis S following rotation of the inner lens barrel 6 in opposite direction.

A third lens holder ring 15 is disposed behind the second lens holder 13 to hold the third lens group 30 and received in the shift barrel 11. The third lens holder ring 15 is provided with three radial cam follower pins 16 arranged at regular angular intervals on the outside wall thereof. A rotatable cylindrical cam barrel 17 is disposed behind the inner lens barrel 6 and received to rotate in the first intermediate lens barrel 4. The cam barrel 17 is formed with three second cam grooves 17a, which are spatially spiral with respect to the optical axis S, on the inside wall thereof. These cam grooves 17a receive the cam follower pins 16 passing through axial guide slots 11b formed in the shift barrel 11, respectively. Through engagement between the cam grooves 17a and the cam follower pins 16, the third lens holder ring 15 shifts back and forth along the optical axis S following rotation of the cam barrel 17 in opposite direction. The cam barrel 17 at its front end is formed with three tongues 17b arranged at regular angular intervals and extending forward which are engaged by the axial end slots 6b of the inner lens barrel 6. Further, the cam barrel 17 at its rear end is formed with two L-shaped guide arms 17c extending radially and arranged diametrically opposite to each other which are received in the axial guide grooves 4d of the first intermediate lens barrel 4. Through engagement between the guide arms 17c and the guide grooves 4d, the cam barrel 17 is rotated together with the first intermediate lens barrel 4. Rotation of the first intermediate lens barrel 4 and the cam barrel 17 as one whole forces the third lens holder ring 15 to shift back and forth along the optical axis S through the engagement of the cam follower pins 16 with the cam grooves 17a of the cam barrel 17.

The zoom lens barrel assembly 1 has a coil spring 18 disposed between the second and third lens holder rings 13 and 15 to force the cam follower pins 14 and 16 against the inside walls of the zooming cam grooves 6a and cam grooves 17a, respectively, in the axial direction. The cam groove 17a at its wide-angle end is formed with a short cam groove extension extending forward which permits the third lens holder ring 15 to approach as close to the second lens holder ring 13 as possible in spite of the coil spring 18 compressed between the second and third lens holder rings 13 and 15 while the zoom lens barrel assembly 1 is retracted. The shift barrel 11 at its front end is reduced in diameter so as to fit on the first lens holder ring 9.

Figure 3:
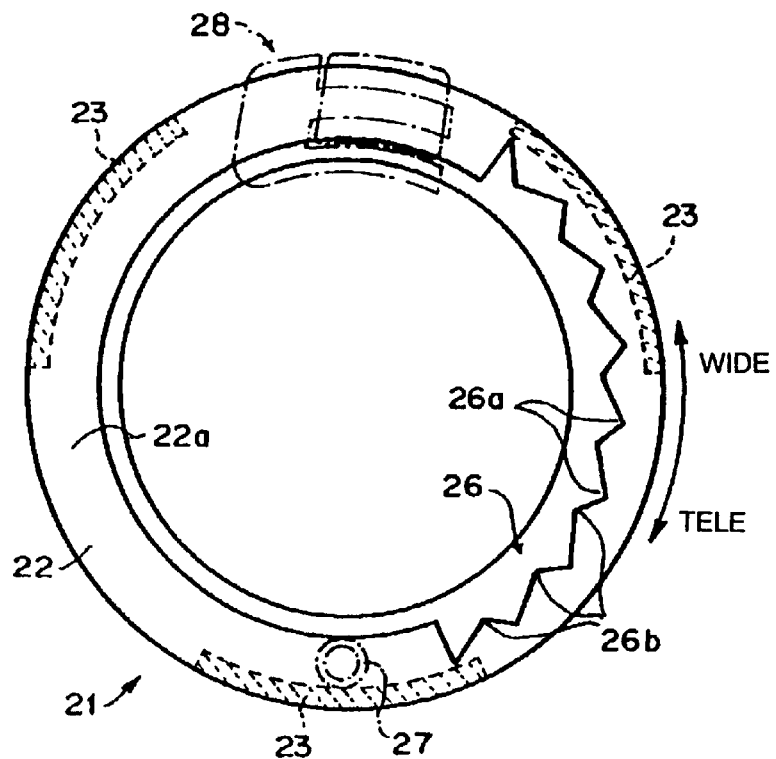
FIG. 3 is a front view of a ring member including positioning latch teeth.

A focusing mechanism is disposed around the front end portion 11c of the shift barrel 11 and incorporates a rotation restraint mechanism 21 having an annular interlocking ring 22 which is coaxially mounted for rotation on the front end portion 11c of the shift barrel 11. The interlocking ring 22 is integrally provided with three curved projections 23 extending rearward from the periphery thereof. Each projection 23 is formed with a focusing cam slot 23a spatially spiral relative to the optical axis S for receiving the cam follower pin 24 of the inner lens barrel 6. Tension springs 25 are mounted between the inner lens barrel 6 and the interlocking ring 22 to force the cam follower pins 24 against an wide-angle end of the focusing cam slots 23a labeled A in FIG. 2. As will be described later, the interlocking ring 22 is able to rotate following rotation of the inner lens barrel 6 unless it is locked by an electromagnetic clutch. As shown in FIG. 3 in detail. As shown in FIG. 3, the interlocking ring 22 at its front side is provided with a positioning ring 26 partly having latch teeth 26a arranged at regular angular intervals along the periphery thereof which define predetermined zoom positions. V-shaped grooves 26b between respective adjacent latch teeth 26a are provided correspondingly to the predetermined zoom positions, for example eight zoom positions, between the wide-angle end and the telephoto end. A pivot shaft 27 is secured to and extends rearward from the annular partition wall 5c of the second intermediate lens barrel 5. The shift barrel 11 at is provided with an electromagnetic solenoid 28 attached to the front end portion 11c thereof and positioned opposite to the pivot shaft 27 with respect to the optical axis S. The electromagnetic solenoid 28 is energized through an externally operable switch (SW) 39.

Figure 4:
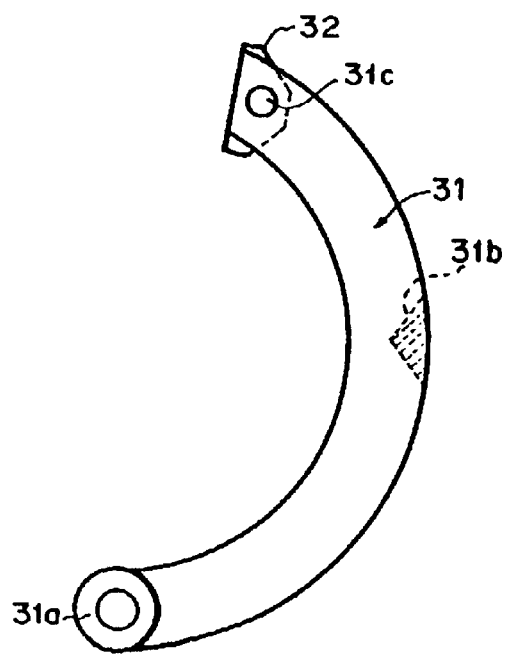
FIG. 4 a front view of a clutch lever.
Figure 5:
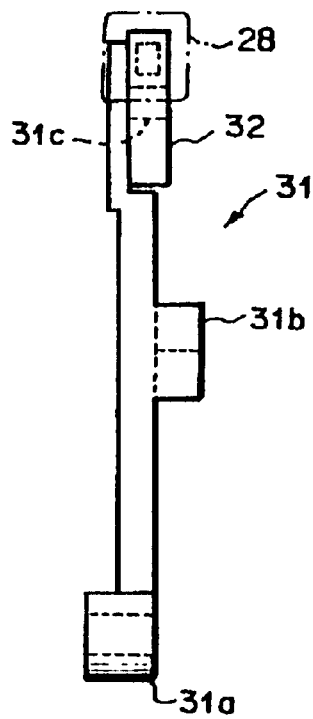
FIG. 5 is a side view of the clutch lever.
Figure 6:
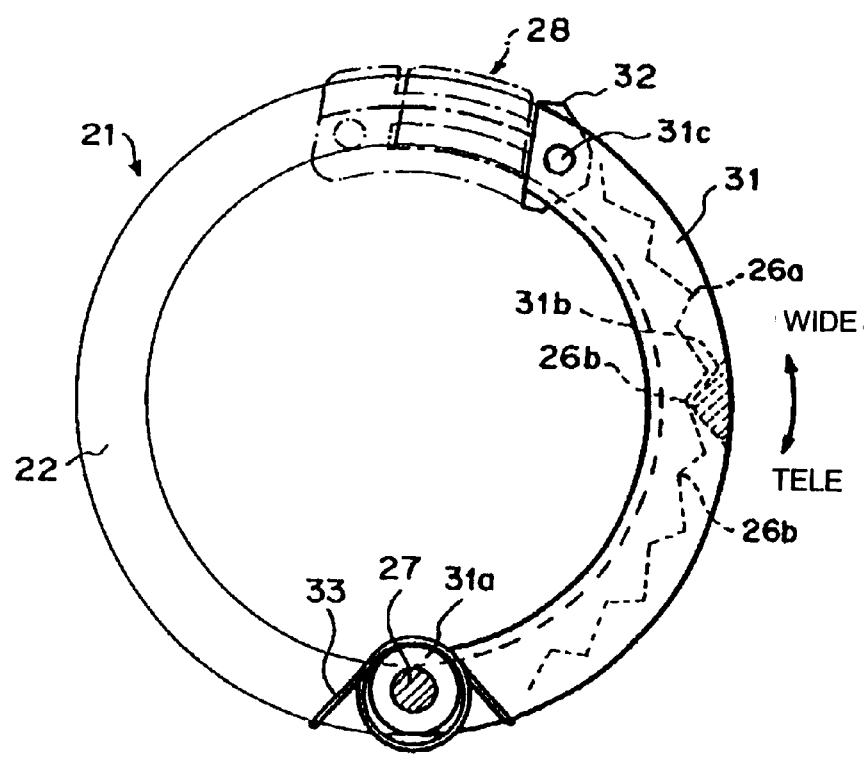
FIG. 6 is a front view of the ring member stopped in one of predetermined zoom positions by the clutch lever.

As shown in FIGS. 4 and 5, the focusing mechanism includes a semi-circular clutch lever 31 which has an end boss 31a pivotally mounted on the pivot shaft 27 and an armature 32 supported on the opposite end thereof by means of a setting pin 31c. The armature 32 is attracted by the electromagnetic solenoid 28 when energized. The clutch lever 31 at its intermediate portion is provided with a triangular claw 31b engageable with the latch teeth 26a. The electromagnetic solenoid 28 and the clutch lever 31 form an electromagnetic clutch mechanism. A coil spring 33 is mounted on the pivot shaft 27 to force the clutch lever 31 in a direction in which the triangular claw 31b engages with the latch teeth 26a of the interlocking ring 22. As shown in FIG. 6, the coil spring 33 forces the clutch lever 31 so as to bring the armature 32 into engagement with the electromagnetic solenoid 28 as long as the triangular claw 31b of the clutch lever 31 is put in any one of the V-shaped grooves 26b even while the electromagnetic solenoid 28 is deenergized. It is noted that, in FIG. 2, the clutch lever 31 is depicted in reversed position in regard to a practical structure for an easy understanding.

As apparent in FIG. 6, the clutch lever 31 and the interlocking ring 22 are arranged such that there is provided a small gap between the triangular claw 31b and each V-shaped groove 26b so as to permit the armature 32 to be brought into certain engagement with the electromagnetic solenoid 28 while the lens is in its retracted position or in a standing position, which is always desirable for the armature 32 to be certainly and quickly attracted by the electromagnetic solenoid 28 when energized and also desirable to remove variations of zoom positions of the inner lens barrel 6 among cameras due to manufacturing and assembling accuracy of interlocking rings 22 and clutch levers 31.

Figure 7:
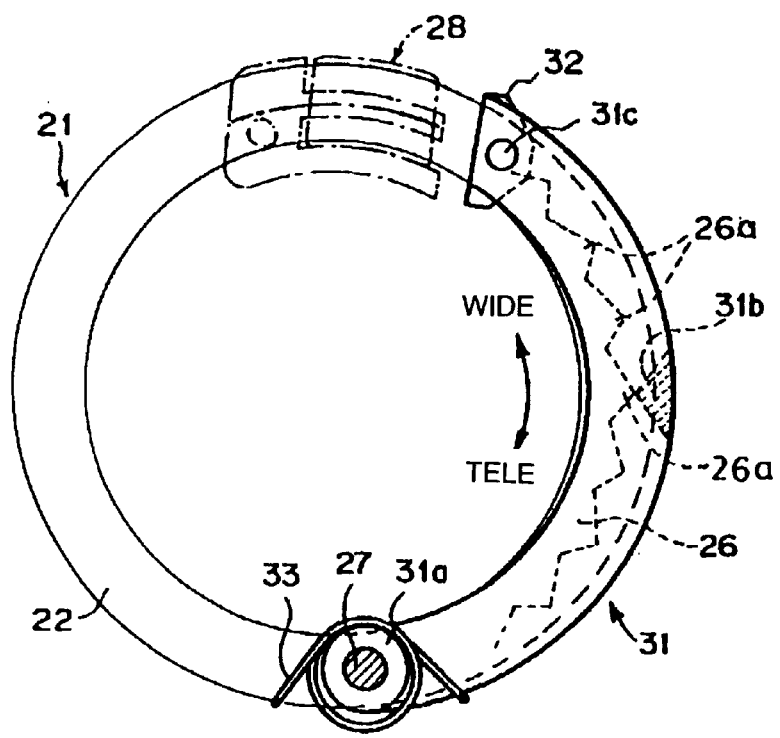
FIG. 7 is a front view of the ring member during changing a zoom position.

While the electromagnetic solenoid 28 remains deenergized, when rotating the interlocking ring 22 to shift the first lens group 10 for adjusting a zoom ratio, the latch teeth 26a expels the triangular claw 31b radially outward against the coil spring 33, so as to pivotally turn the clutch lever 31 to move the armature 32 separately away from the electromagnetic solenoid 28. When the triangular claw 31b is driven out of the V-shaped groove 26b and disengaged from the latch teeth 26a as shown in FIG. 7, the interlocking ring 22 and the inner lens barrel 6 are rotationally integrated. In this instance, as apparent from FIG. 7, Each saw tooth 26a has a flank more gentle on the wide-angle side than the telephoto side so as to make the triangular claw 31b more easily climb over the saw tooth 26a during rotation of the interlocking ring 22 toward the wide-angle end, i.e. in the counterclockwise direction as viewed in FIG. 7 than during rotation of the interlocking ring 22 toward the telephoto end, i.e. in the clockwise direction as viewed in FIG. 7.

Figure 8:
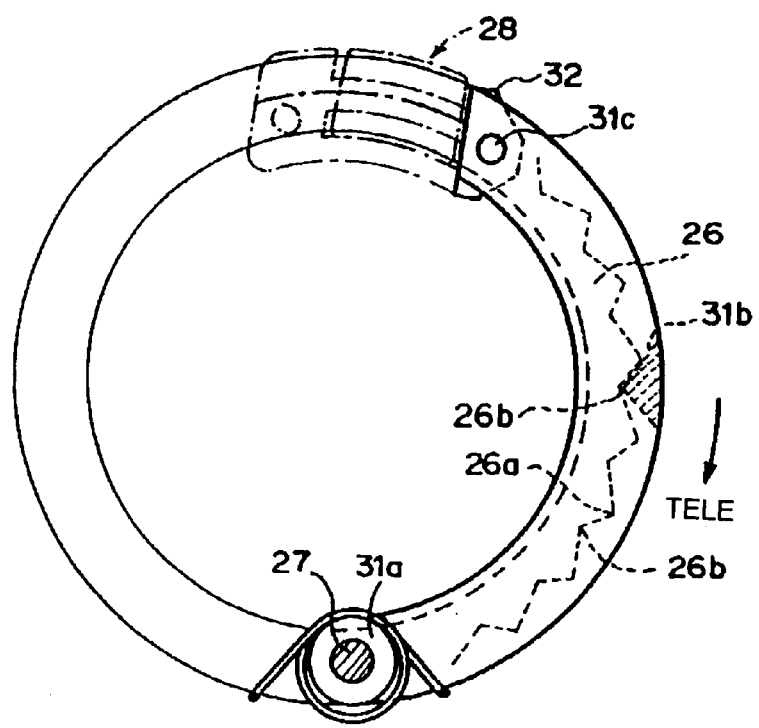
FIG. 8 is a front view of the ring member locked by the clutch lever.

For focusing the lens, as shown in FIG. 8, while the interlocking ring 22 is rotated toward the telephoto end, when the electromagnetic solenoid 28 is energized at a moment that the lens is focused on, the clutch lever 31 is forced to bring the triangular claw 31b into engagement with one of the V-shaped grooves 26b, restraining the interlocking ring 22. As a result, the inner lens barrel 6 rotates relatively to the interlocking ring 22, it is guided by the focusing cam slots 23a of the interlocking ring 22 to shift axially. Simultaneously, during rotation, the inner lens barrel 6 forces the second lens holder ring 13 with the cam follower pins 14 in engagement with the zooming cam grooves 6a of the inner lens barrel 6 to shift axially relatively to the inner lens barrel 6. As a result, the second lens group 20 shifts along the optical axis S under cooperation with the zooming cam grooves 6a and the focusing cam slots 23a differently from zoom ratio adjusting motion, so as to achieve focusing.

As shown in FIG. 1, a printed circuit board 34 forming part of an encoder for detecting angular positions of rotation of the inner lens barrel 6 is attached to an area 22a of the interlocking ring 22 at one side, either front or back, where no latch teeth is provided. A contact brush 35 is secured to the shift barrel 11 (see FIG. 2) to contact to and slide on the printed circuit board 34.

The operation of the zoom lens barrel assembly 1 will be described in detail below.

For adjusting a zoom ratio of the zoom lens, when electric motor is actuated, the first intermediate lens barrel 4 rotates and moves along the optical axis S. The second intermediate lens barrel 5 does not rotate but moves together with the shift barrel 11 along the optical axis S, shifting the first lens group 10 along the optical axis S. Following the rotation of the first intermediate lens barrel 4, the inner lens barrel 6, the cam barrel 17 and the interlocking ring 22 rotate all together as one whole, shifting the second and third lens groups 20 and 30 along the optical axis S and positioning them in an axial position according to the cam groove 6a and 17a. During the rotation of the interlocking ring 22, the latch teeth 26a repeatedly expels the triangular claw 31b radially outward against the coil spring 33.

For focusing the zoom lens, the electromagnetic solenoid 28 is energized to attract the armature 32 of the clutch lever 31 and restrain the clutch lever 31. When the electric motor is actuated, while the first intermediate lens barrel 4, the inner lens barrel 6 and the cam barrel 17 rotate all together as one whole toward the telephoto end, the interlocking ring 22 is restricted from rotation by the clutch lever 31 through engagement between the latch teeth 26a and the triangular claw 31b. Simultaneously, the inner lens barrel 6 forces the second lens holder ring 13 (the second lens group 20) with the cam follower pins 24 in engagement with the focusing cam slots 23a to shift along the optical axis S differently from zoom ratio adjusting motion, so as to achieve focusing. There is no difference in motion of the first and third lens groups 10 and 30 between focusing and adjusting a zoom ratio.

Figure 9:
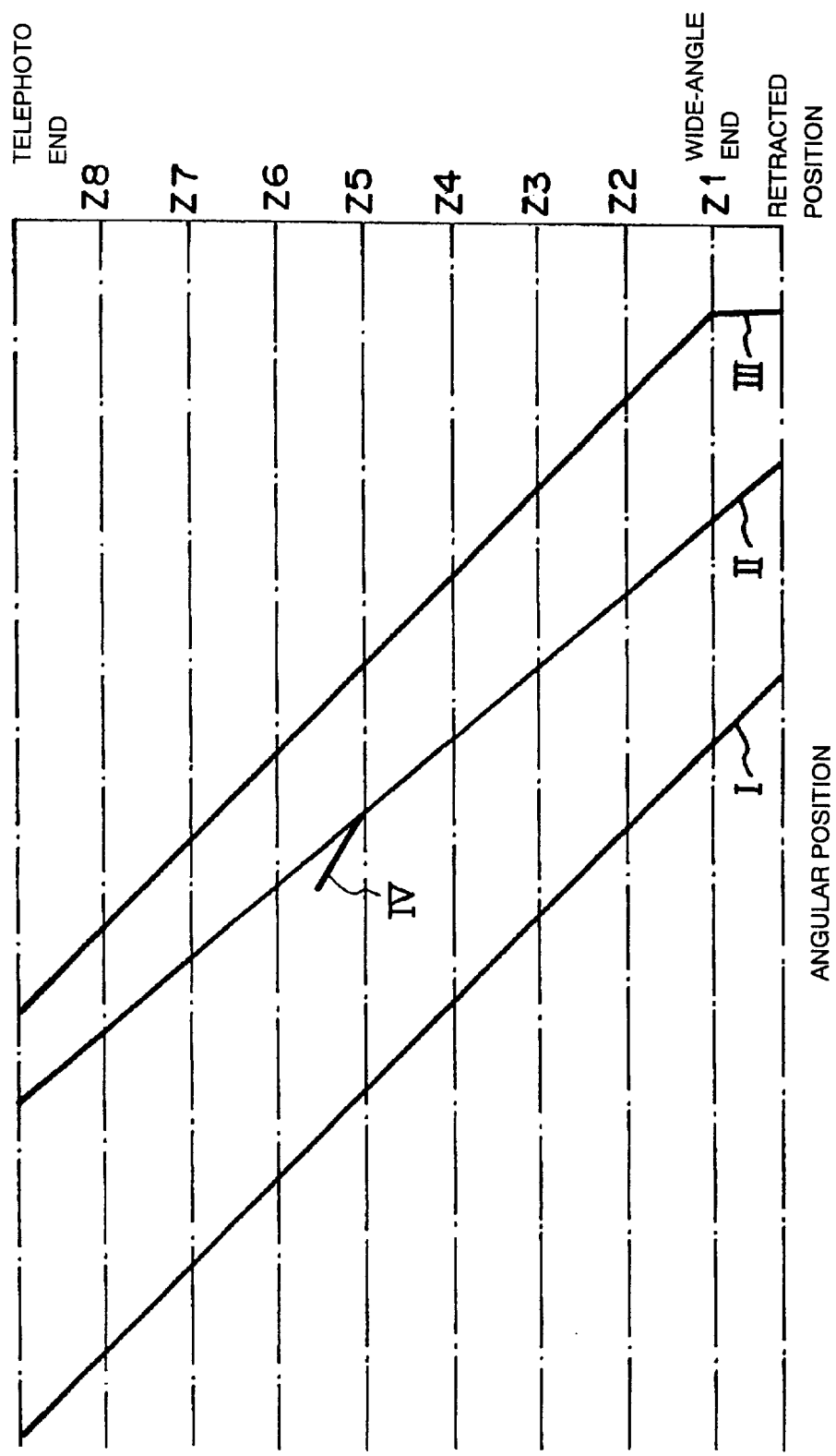
FIG. 9 is a diagram showing movement of first to third lens groups with respect to rotational angular positions of the rotatable second barrel.

FIG. 9 is a diagram showing axial positions of the first to third lens groups 10–30 with respect to rotational angles of the first intermediate lens barrel 4, and hence the interlocking ring 22. In FIG. 9 lines I, II and II are scheduled axial shift lines for the first to third lens groups 10, 20 and 30, respectively, and Z1–Z8 are predetermined zoom positions corresponding to angles of rotation of the first intermediate lens barrel 4 which are detected by the encoder incorporated in the rotation restraint mechanism 21. As was previously described, the zoom positions are unconditionally specified by angular positions of the V-shaped grooves 26b. A segment IV represents a scheduled shift line for the second lens group 20 while the first intermediate lens barrel 4 rotates toward the telephoto end with the interlocking ring 22 restrained by the clutch lever 31 during focusing.

When an exposure is completed, the electric motor is driven in the reverse direction to shift the first to third lens groups 10–30 to the zoom position Z5, i.e. the standing position, in which the first to third lens groups 10–30 stand ready for another focusing and adjusting a zoom ratio of the zoom lens.

Figure 10:
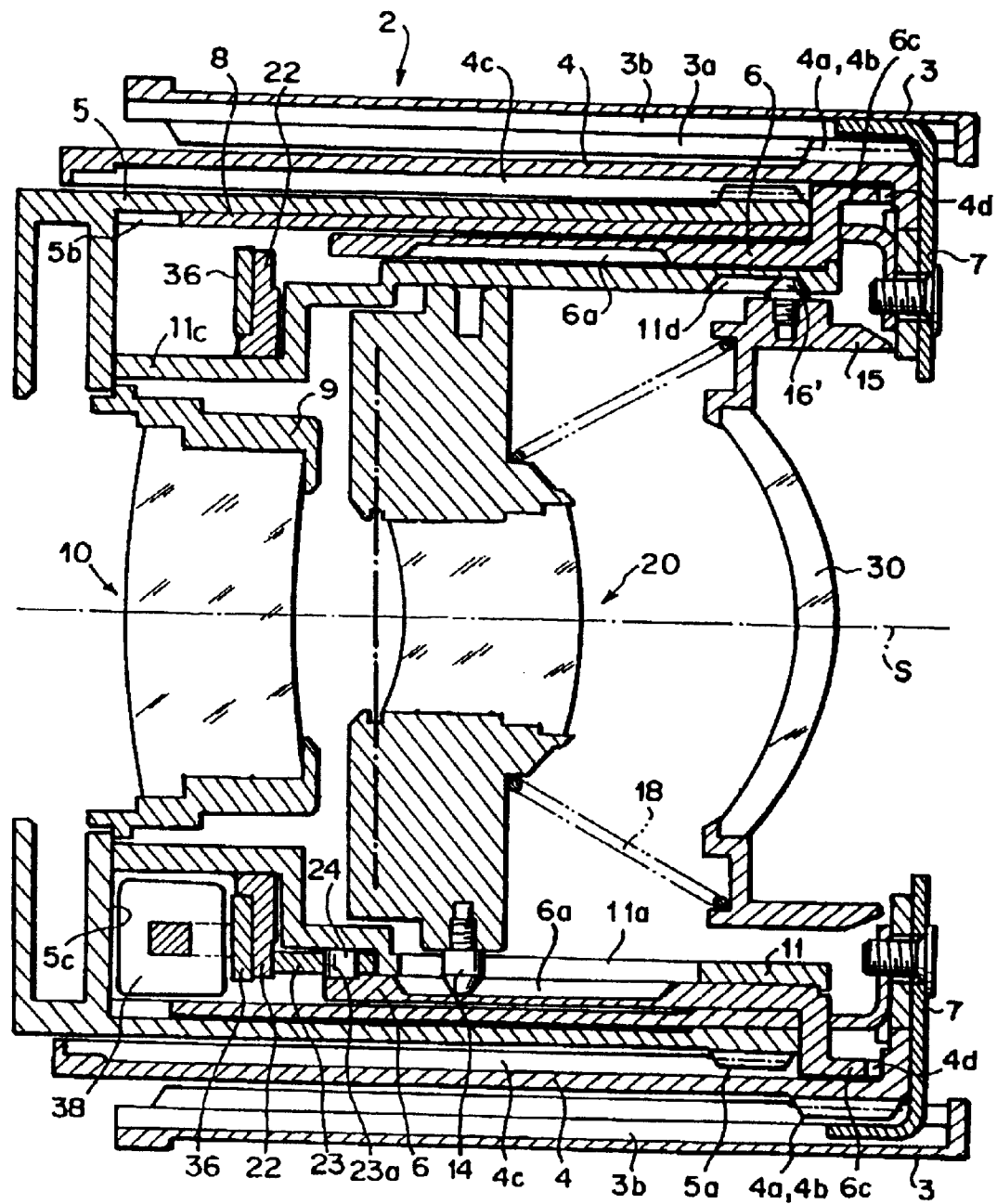
FIG. 10 is a cross-sectional view of a zoom lens barrel assembly in accordance with another embodiment of the invention which is placed in a wide-angle position.
Figure 11:
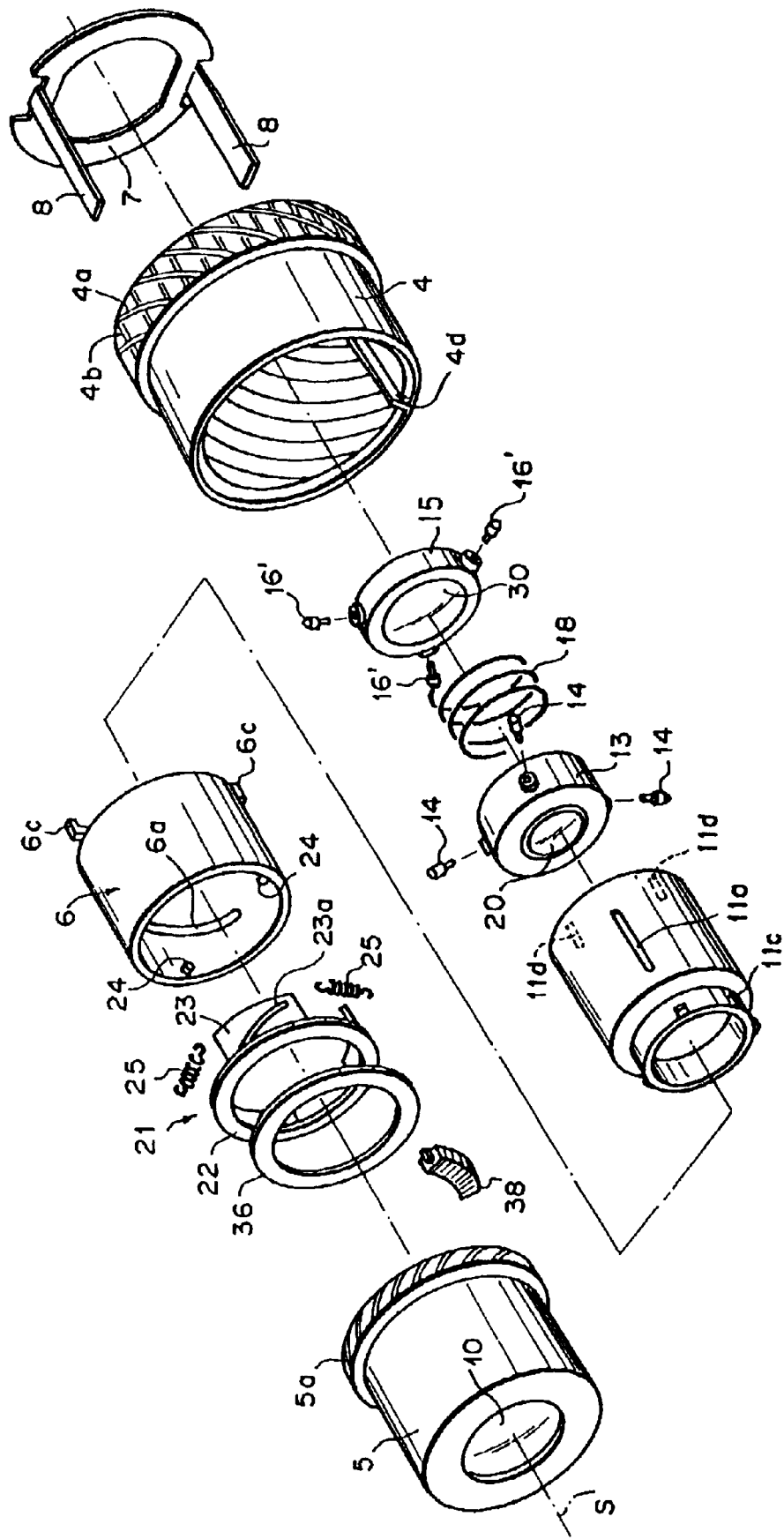
FIG. 11 is an exploded perspective view of the zoom lens barrel assembly shown in FIG. 10.

FIGS. 10 and 11 show a zoom lens barrel assembly 2 in accordance with another embodiment of the invention. The zoom lens barrel assembly 2 of this embodiment is different from that of the previous embodiment in some points that there is no cam barrel, corresponding to the cam barrel 17 of the previous embodiment, for supporting the third lens holder ring 15 holding the third lens group 30, the third lens holder ring 15 is floatingly supported by a shift barrel 11 and a rotation restraint mechanism 21 incorporates not a clutch lever but an electromagnetic attraction plate.

As shown in FIGS. 10 and 11, a shift barrel 11 is formed with internal guide grooves 11d which extend axially but do not reach the rear end of the shift barrel 11. Each axial guide groove 11d receives a guide pin 16' radially extends from a third lens holder ring 15 to allow the third lens holder ring 15 to move back and forth relative to the shift barrel 11 along an optical axis S of a zoom lens comprising first to third lens groups 10, 20 and 30. A coil spring 18 is mounted between the second and third lens holder rings 13 and 15 to force the third lens holder ring 15 such that the guide pins 16' of the third lens holder ring 15 are forced against the rear ends of the guide grooves 11d of the shift barrel 11 by the coil spring 18 so as to place the first and third lens holder rings 9 and 15 at a fixed axial distance while the zoom lens barrel assembly 2 is put in any protruded position and the guide pins 16' of the third lens holder ring 15 are forced against the front ends of the guide grooves 11d of the shift barrel 11 against the coil spring 18 so as to place the third lens holder ring 15 as close to the first lens holder ring 9 as possible while the zoom lens barrel assembly 2 is put in the retracted position. The inner lens barrel 6 at its rear end is formed with two L-shaped guide arms 6c extending radially and arranged diametrically opposite to each other which are received in axial guide grooves 4d of the first intermediate lens barrel 4. Through engagement between the guide arms 6c and the guide grooves 4d, the inner lens barrel 6 is rotated together with the first intermediate lens barrel 4.

A focusing mechanism is disposed around a front end portion 11c of the shift barrel 11 and incorporates a rotation restraint mechanism 21 having an annular interlocking ring 22 which is coaxially mounted for rotation on the front end portion 11c of the shift barrel 11. The interlocking ring 22 is provided with an annular electromagnetic plate 36 secured to the front side thereof. A second intermediate lens barrel 5 at its front end is formed with an annular partition wall 5c. An electromagnetic solenoid 38 is secured to the annular partition wall 5c. These electromagnetic solenoid and plate 38 and 36 form an electromagnetic clutch mechanism. When the electromagnetic solenoid 38 is energized, it attracts the annular electromagnetic plate 36 of the interlocking ring 22 to restraint rotation of the interlocking ring 22. While the electromagnetic solenoid 38 remains deenergized, the annular electromagnetic plate 36 and the interlocking ring 22 rotates as one whole during adjusting a zoom ratio of the zoom lens. When the electric motor stops at a zoom position detected by the encoder, the electromagnetic solenoid 38 is energized to attract the annular electromagnetic plate 36, restricting the interlocking ring 22 from rotation. In this state, the first intermediate lens barrel 4 is rotated toward the telephoto end to shift the second lens group 20 held by the second lens holder ring 13 along the line segment IV shown in FIG. 9 for focusing. The electromagnetic solenoid 38 may be energized to brake the first intermediate lens barrel 4 when the electric motor is stopped.

Excepting the structure and function of the zoom lens barrel assembly 2 specifically described above, the zoom lens barrel assembly 2 is quite similar in structure and function to the first embodiment of zoom lens barrel assembly 1.

According to the zoom lens barrel assembly 2, both focusing and adjusting a zoom ratio are achieved by rotating only one of the four lens barrel, i.e. the first intermediate lens barrel 4, and energizing and deenergizing the electromagnetic clutch mechanism. The electromagnetic clutch mechanism is structured such that the electromagnetic solenoid 38 is energized to attract the electromagnetic plate 36 secured to the interlocking ring 22 so as thereby to restrain rotation of the interlocking ring 22. By means of this electromagnetic clutch mechanism, focusing is achieved whenever the zoom lens is put in any scheduled zoom position determined by the encoder.

The zoom lens barrel assemblies 1 and 2 described above are applied to zoom lenses comprised of the first and second lens groups 10 and 20 only with the same effects.

Figure 12:
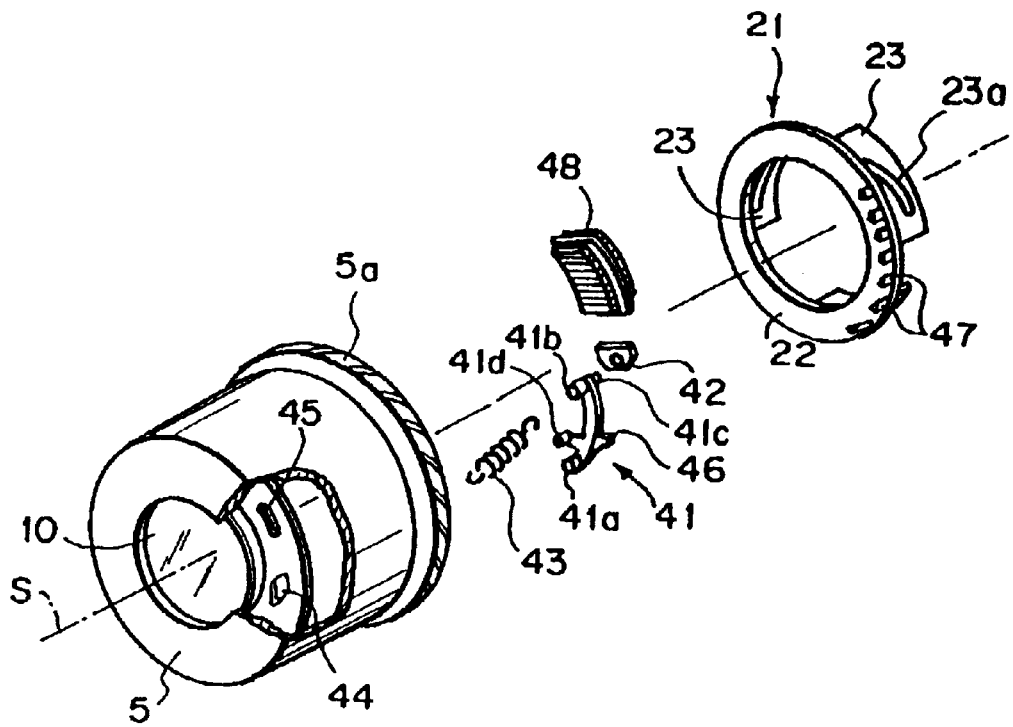
FIG. 12 is an exploded perspective view of an essential part of a zoom lens barrel assembly in accordance with still another embodiment of the invention.
Figure 13:
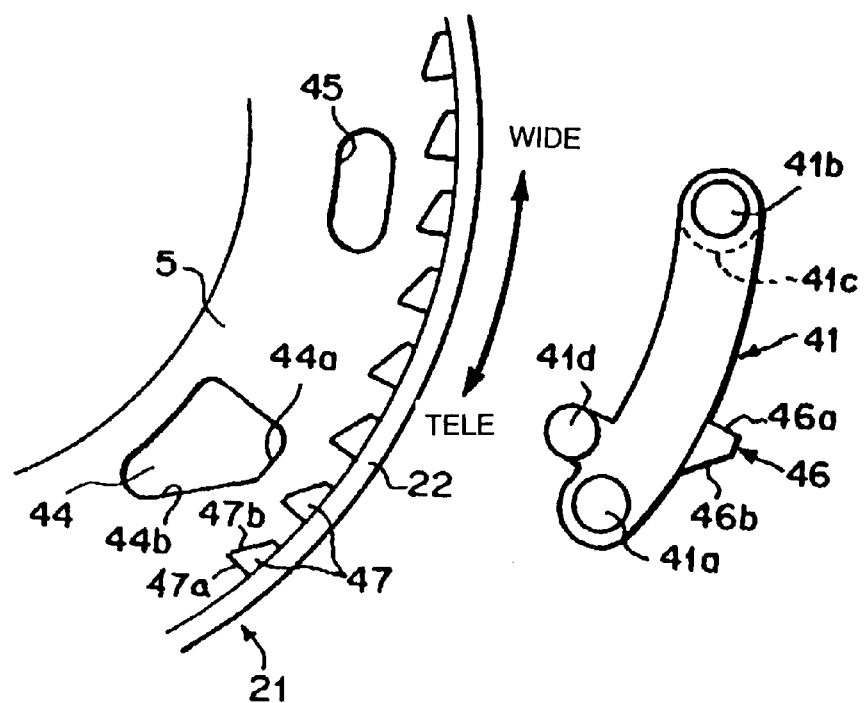
FIG. 13 is an exploded view showing partly a ring member and a slide lever.

FIGS. 12 and 13 show a variation of the electromagnetic clutch mechanism incorporated in the zoom lens barrel assembly 1 shown in FIGS. 1 and 2. The following description is directed to parts and mechanisms only different from those of the zoom lens barrel assembly 1 shown in FIGS. 1 and 2. An electromagnetic clutch mechanism shown in FIGS. 12 and 13 employs a clutch slider 41 in place of the clutch lever 31 of that shown in FIGS. 1 and 2. The clutch slider 41 is provided with a telephoto side cam follower pin 41a and a wide-angle side cam follower pin 41b at opposite ends thereof. Further the clutch slider 41 is formed with a substantially trapezoidal claw 46 at one side close to one thereof and provided with a retainer pin 41d at another side close to the one end thereof. An armature 42 is pivotally mounted on a pivot shaft 41c which is secured to the clutch slider 41 such that the cam follower pin 41b and the pivot shaft 41c are coaxial with each other but placed at opposite sides of the clutch slider 41. This pivot shaft 41c is coaxially A second intermediate lens barrel 5 has a partition wall 5c which is formed with a telephoto side cam slot 44 and a wide-angle side cam slot 45 separated at a specified angle which are engaged by the cam follower pins 41a and 41b, respectively. A rotation restraint mechanism 21 has an annular interlocking ring 22 which is coaxially mounted for rotation on a front end portion 11c of a shift barrel 11 (see FIG. 1). The interlocking ring 22 is provided with a plurality of latch teeth 47 arranged at regular angular intervals along the periphery thereof which define predetermined zoom positions. These latch teeth 47 are engageable with the trapezoidal claw 46 of the clutch slider 41. A tension spring 43 is mounted between the retainer pin 41d of the clutch slider 41 and the second intermediate lens barrel 5. The trapezoidal claw 46 of the clutch slider 41 has a flank 46a perpendicular to the optical axis S on the wide-angle side and a flank 46b inclined at a specified angle with respect to the flank 4a on the telephoto side. On the other hand, the latch tooth 47 of the interlocking ring 22 has a flank 47a perpendicular to the optical axis S on the telephoto side and a flank 47b inclined at a specified angle with respect to the flank 4a on the wide-angle side.

The telephoto side cam slot 44 has two cam surfaces, namely a relatively short first cam surface 44a substantially lying on a circle round a center on the optical axis S and a relatively long second cam surface 44b directly adjacent to the first cam surface 44a and directed toward the optical axis S from the first cam surface 44a. The second cam surface 44b guides the cam follower pin 41a in a direction in which the clutch slider 41 slides to bring the trapezoidal claw 46 out of engagement with one of the latch teeth 47. The telephoto side cam slot 44 has an opening as large as to permit the clutch slider 41 to swing about the cam follower pin 41b in the clockwise direction as viewed in FIG. 13. The wide-angle side cam slot 45 has a circular arcuate opening for guiding the cam follower pin 41b along a circle round a center on the optical axis S. The tension spring 43 forces the clutch slider 41 in a direction in which the clutch slider 41 brings the trapezoidal claw 46 into engagement with any one of the latch teeth 47 of the interlocking ring 22 and forces the armature 42 against an electromagnetic solenoid 38. Further the tension spring 43 forces the cam follower pin 41a against the cam surface 44a or 44b of the telephoto side cam slot 44.

The operation of the zoom lens barrel assembly depicted in FIGS. 12 and 13 will be best understood by referring to FIGS. 14A through 14D.

When the interlocking ring 22 is placed in one of scheduled zoom positions, the clutch slider 41 is forced by the tension spring 43 to hold the trapezoidal claw 46 engaged between latch teeth 47 corresponding the scheduled zoom position and the armature 42 forced against an iron core 38a of the electromagnetic solenoid 38 as shown in FIG. 14A. In this position, the telephoto side cam follower pin 41a and the wide-angle side cam follower pin 41b are forced against wide-angle side ends of the telephoto side cam slot 44 and the wide-angle side cam slot 45, respectively. During changing a zoom ratio of the zoom lens toward the telephoto side, the interlocking ring 22 is rotated toward the telephoto side, as a result of which, the latch tooth 47 at its vertical flank 47a of the interlocking ring 22 is brought into engagement with the vertical flank 46a of the trapezoidal claw 46 of the clutch slider 41, and then forces the clutch slider 41 toward the telephoto side through the engagement as shown in FIG. 14B. At this time, since the electromagnetic solenoid 38 remains deenergized, the clutch slider 41 slides toward the telephoto side against the tension spring 43, which is accompanied by a shift of the cam follower pin 41b along the wide-angle side cam slot 45 toward the telephoto side. This cause the cam follower pin 41a to shift along the second cam surface 44b of the telephoto side cam slot 44 to the right as viewed in FIG. 14B, bringing the trapezoidal claw 46 of the clutch slider 41 into disengagement from the latch tooth 47 of the interlocking ring 22 with the result of permitting the interlocking ring 22 to rotate.

During changing a zoom ratio of the zoom lens toward the wide-angle side, the interlocking ring 22 is rotated toward the telephoto side, as a result of which, the inclined flank 46b of the trapezoidal claw 46 of the clutch slider 41 is brought into engagement with the latch tooth 47 at its inclined flank 47b of the interlocking ring 22, and then the clutch slider 41 is expelled to bring the trapezoidal claw 46 into disengagement from the latch tooth 47 of the interlocking ring 22 as shown in FIG. 14C. Consequently, the interlocking ring 22 is permitted to continuously rotate toward the wide-angle side. At this time, since the armature 42 remains forced against the iron core 48a of the electromagnetic solenoid 38 by the tension spring 43, the clutch slider 41 swings about the cam follower pin 41b in the clockwise direction as viewed in FIG. 14C.

When it is intended to achieve focusing of the zoom lens, a winding 38b is applied with a current to energize the electromagnetic solenoid 38 to attract the armature 42 of the clutch slide 41 to the iron core 38a, fixing the clutch slider 41 in position as shown in FIGS. 14A and 14D. As a result, the interlocking ring 22 is prevented from rotation toward the telephoto side by means of engagement between the latch tooth 47 at its vertical flank 47a and the trapezoidal claw 46 at the vertical flank 46a. In a similar manner in the zoom lens barrel assembly 1 shown in FIGS. 1 and 2, the zoom lens is focused through engagement between the focusing cam slots 23a of the interlocking ring 22 and the cam follower pins 24 of the inner lens barrel 6.

According to the zoom lens barrel assembly, the electromagnetic clutch mechanism is structured such that the electromagnetic solenoid 38 is energized to bring the trapezoidal claw 46 of the clutch slider 41 into engagement with the latch tooth 47 of the interlocking ring 22, so as to restrain rotation of the interlocking ring 22, which makes it assured to achieve focusing. By means of this electromagnetic clutch mechanism, focusing is achieved whenever the zoom lens is put in any scheduled zoom position determined by the encoder.

It is to be understood that the present invention may be embodied with various changes, modifications and improvements, which may occur to those skilled in the art, without departing from the spirit and scope of the invention defined in the following claims.

What is claimed is:

1. A zoom lens barrel assembly for a zoom lens which is driven to achieve both focusing and zoom ratio adjusting of the zoom lens, said zoom lens barrel assembly comprising:

a rotatable driven lens barrel;

a first lens guide mechanism for shifting at least one lens group of said zoom lens to achieve focusing of said zoom lens, the first lens guide mechanism being connected to the rotatable driven lens barrel;

a second lens guide mechanism for shifting at least said one lens group of said zoom lens differently from said first lens guide mechanism to adjust a zoom ratio of said zoom lens, the second lens guide mechanism being connected to the rotatable driven lens barrel; and an electrically operated clutch mechanism for selectively actuating said first and second lens guide mechanisms;

wherein each of the first and second lens drive mechanisms is actuated by rotation of the rotatable driven lens barrel.

2. A zoom lens barrel assembly for a zoom lens comprising at least first and second lens groups arranged on an optical axis from a subject side to an image side in order, said zoom lens barrel assembly comprising:

a rotatable first barrel capable of rotating about said optical axis to shift said first lens group along said optical axis to achieve focusing and adjusting a zoom ratio of said zoom lens;

a rotatable second barrel arranged coaxially with said rotatable first barrel and capable of rotating about said optical axis following rotation of said rotatable first barrel, said rotatable second barrel being provided with first guide means for shifting said second lens group back and forth relatively to said rotatable second barrel along said optical axis according to rotation of said rotatable second barrel;

a rotatable ring member arranged coaxially with said first and rotatable second barrels and capable of rotating relatively to said rotatable second barrel about said optical axis, said rotatable ring member being provided with second guide means for shifting said rotatable second barrel back and forth relatively to said rotatable ring member when said rotatable ring member and said rotatable second barrel rotate relatively to each other;

a clutch mechanism for locking said rotatable ring member to permit relative rotation between said rotatable ring member and said rotatable second barrel to shift said second lens group according to said first and second guide means for achieving focusing of said zoom lens while said rotatable first barrel is rotated and unlocking said rotatable ring member to couple said rotatable ring member and said rotatable second barrel so that said rotatable ring member rotates following said rotatable second barrel to shift said second lens group according to said first guide means for adjusting a zoom ratio of said zoom lens while said rotatable first barrel is rotated; and switching means for causing said clutch mechanism to lock and unlock said rotatable ring member.

3. The zoom lens barrel assembly as defined in claim 2, wherein said clutch mechanism is disposed around said first lens group.

4. The zoom lens barrel assembly as defined in claim 2, wherein said clutch mechanism includes an encoder for detecting rotational angular position of said rotatable second barrel.

5. The zoom lens barrel assembly as defined in claim 2, wherein said clutch mechanism comprises an electromagnetic solenoid energized during focusing said zoom lens and deenergized during adjusting a zoom ratio of said zoom lens, positioning means for positioning said rotatable ring member in a desired one of a plurality of predetermined angular positions relative to said rotatable second barrel when said electromagnetic solenoid is energized.

6. The zoom lens barrel assembly as defined in claim 5, wherein said positioning means comprises latch teeth arranged at regular angular intervals on said rotatable ring member to define said predetermined angular positions, a latch lever engageable with said latch teeth, and a tension member for imparting tension on said latch lever toward said latch teeth, said electromagnetic solenoid attracting said latch lever to bring said latch lever into engagement with any one of said latch teeth when energized to achieve so as to position said rotatable ring member in one of said predetermined angular positions and releasing said latch lever so as to permit said rotatable ring member to rotate against said tension member.

7. The zoom lens barrel assembly as defined in claim 6, wherein said latch teeth are provided on said rotatable ring member and arranged on a circular-arcuate line segment round a center on said optical axis, and said latch lever is pivotally mounted on said rotatable ring member so as to swing along a circular-arcuate line segment passing said optical axis when attracted by said electromagnetic solenoid.

* * * * *